April 6, 1937.   J. A. MARQUIS   2,076,242
PERIOD COMPUTING DEVICE
Filed March 12, 1935
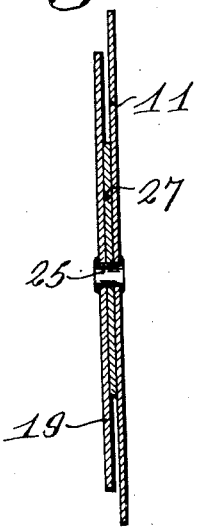
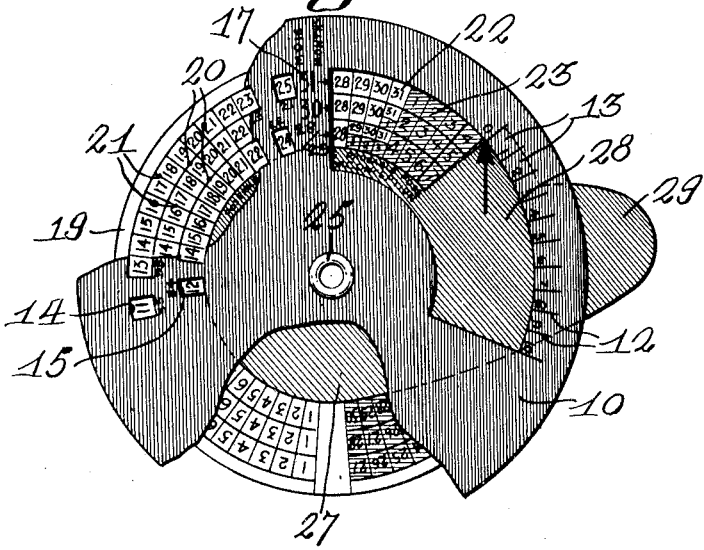
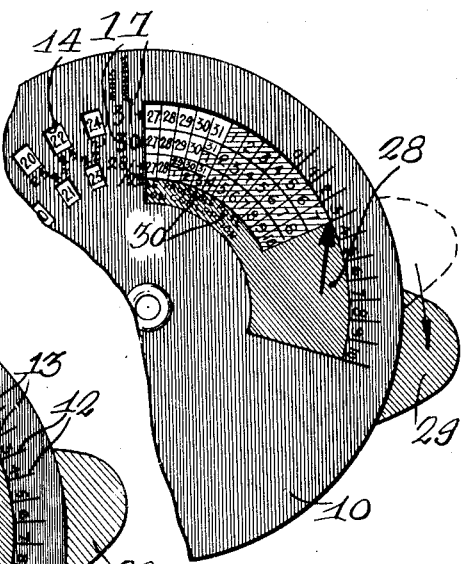
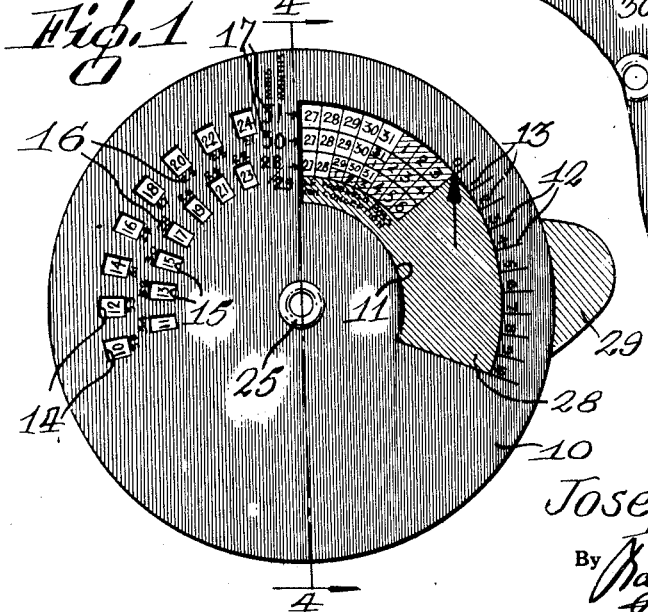
Inventor
Joseph A. Marquis
By Raymond C. Roden
Attorney Patented Apr. 6, 1937

2,076,242

UNITED STATES PATENT OFFICE 2,076,242

PERIOD COMPUTING DEVICE

Joseph A. Marquis, Quebec, Quebec, Canada

Application March 12, 1935, Serial No. 10,593
In Canada September 18, 1934

2 Claims. (Cl. 40—115)

The present invention relates to computing devices and more particularly to devices adapted for computing the fertile period in menstrual cycles.

An object of the invention is the provision of a device which will enable rapid computation of fertile periods in the menstrual cycles of women.

A further object of the invention is the provision of a device of the above character which may be adjusted so that tolerance may be made for irregularities in the cycles.

Another object of the invention is the provision of a device of the aforesaid character designed so that the operation thereof may be readily understood.

A still further object of the invention is the provision of a computing device of the above type which is simple and inexpensive in construction.

Other objects and advantages of the invention will become apparent as the description progresses.

In the accompanying drawing forming a part of this specification and in which like reference characters are employed to designate corresponding parts throughout the same:—

Figure 1 is a front elevational view of the assembled device,

Figure 2 is a similar view showing the front section partly broken away,

Figure 3 is a fragmentary front elevational view showing the tolerance indicator adjusted to allow for irregularities, and Figure 4 is a diametrical section taken on the line 4—4 of Figure 1.

Referring to the drawing, wherein for the purpose of illustration is shown a preferred embodiment of the invention, the numeral 10 designates the front section of the device which is in the form of a flat relatively thin element, in the present instance disc shaped.

A portion of the front disc 10 is cut out to form an arcuately shaped relatively large exhibiting opening 11 having scale forming graduations 12 disposed partially at the outer edge identified by the numeral 13, numbered consecutively from 0 to 10. In the opposed upper quadrant the disc 10 is formed with a series of arcuately spaced radial apertures 14. Disposed inwardly of the apertures 14 is a second series of arcuately spaced apertures 15 arranged in staggered relation with respect to the outer arc. The two arcuate series of apertures are consecutively numbered from 21 to 35 inclusive, as indicated at 16, in alternately staggered relation. At one radial edge of the arcuate opening 11 are disposed numerical designations 28/29, 30, 31, indicated generally by the numeral 17, designating months containing correspondingly numbered days.

Disposed in the rear of and adjacent to the front disc 10 and rotatable relative thereto is a rear disc 19 of slightly decreased diameter. On the inner or front face of the rear disc 19 are marked arcuate, approximately circular lines 20 intercepted by uniformly spaced radial lines 21 to form a plurality of, in the present instance three, concentric arcs of spaces. A portion of the front face of the disc 19 is of one colour, as for instance white, as indicated at 22, while another portion is of a contrasting colour, as for instance blue, as indicated at 23. The three concentric arcs of spaces in the white coloured portion are numbered consecutively from 1 to 31, designating days of the month. The outer arc of spaces in the blue portion is numbered from 1 to 27. The intermediate arc of spaces in the blue portion is numbered from 2 to 28, the numeral 1 of this arcuate series occupying a blue shaded fragmentary portion of the last white space in the corresponding row. The inner arc of spaces on the blue field is numbered from 4 to 30, the numerals 1, 2 and 3 of this series being marked on blue shaded fragmentary portions of the last three white spaces in the corresponding arc, as shown to advantage at Figures 1, 2 and 3. The front and rear discs 10 and 19 respectively are rotatably connected by a pivot fastener 25.

Movably mounted between the front and rear discs and rotatable about the pivot 25 is an intermediate section embodying a central approximately disc-shaped hub portion 27 formed with an outwardly projecting shield forming portion 28 disposed to partially cover the opening 11 in the front disc to obscure a portion of the front face of the rear disc. This intermediate section is provided with a radially extending thumb-piece 29 through the medium of which the section is rotated on the pivot 25. Upon an arcuate marginal portion of the hub forming disc 27 are marked the words "Possible conception" and "Probable conception", as indicated at 30 and arranged to be exposed through the exhibiting opening 11.

The discs 11 and 19 as well as the tolerance indicator 28 may be formed of cardboard, celluloid or other suitable material and are preferably of contrasting colours. Thus, the front disc 12 may be red while the tolerance indicator is green, the front face of the rear disc 19 being, as previously indicated, white and blue.

The construction of the device is based on scientific physiological discoveries indicating that the menstrual cycle of a normal fertile woman constitutes definite sterile and fertile periods. If, in any given case, the menstrual cycle is known from experience to uniformly constitute twenty-eight days, the days constituting the fertile period may be directly computed by disposing the radial edge of the tolerance indicator shield 28, as indicated by the arrow, in registration with the zero graduation of the scale 12 and rotating the rear disc 19 with respect to the red front disc and the green indicator so that in the front disc aperture designated 28, as representative of the 28-day cycle, will be disposed on the white portion of the rear disc 19 the numeral corresponding to the date at which the last menstruation began. On the exposed outer arc of the rear disc, the dates of possible or probable conception are read in the row opposite the proper numeral of the column "Months", according to the number of days of the month wherein the said menstruation occurred. Thus are indicated the 7 to 14 days of less fertile period of the cycle, the period during which conception is possible only, as indicated on the sections "Possible conception". The word "Probable" on the exposed arc of the small indicator disc will designate the 9 to 12 days of the cycle as those in which conception is most probable. Thus, by adjusting the various elements of the device, the distinct periods of the cycles of different duration may be established knowing the date of menstruation.

In cases where the menstrual cycle is known to vary by one or more days, a period of tolerance is obtainable by movement of the indicator 28, the edge indicated by an arrow being disposed on the scale of the front disc in accordance with the maximum irregularity calculated in days. The computation of approximate periods of fertility where the cycles are irregular to a limited established extent is conducted afterwards as above.

It is to be understood that the form of my invention herein shown and described is to be taken as a preferred example of the same and that various changes as to the shape, size and arrangement of parts may be resorted to without departing from the spirit of the invention or the scope of the subjoined claims.

Having thus described my invention, I claim:—

1. A device of the character described comprising a front disc provided with a relatively large arcuate opening and a plurality of arcuately spaced small apertures, the said apertures being identified by consecutive numerals corresponding to various cycles, a rear disc connected with and rotatable relative to the front disc, the inner face of the said rear disc having marked thereon concentrically arranged arcuate spaces consecutively numbered in correspondence with days of the month, the said rear disc being movable to arrange selected numerals thereon in registration with a given aperture in the front disc so as to exhibit through the large opening in the front disc the days constituting the fertile period of the cycle, and means rotatable with the discs and adapted to compensate for irregularities in the menstrual cycle by obscuring portions of the rear disc appearing through the front disc large opening.

2. A device of the character described comprising a front disc provided with a relatively large arcuate opening and a plurality of arcuately spaced small apertures, the said apertures being identified by consecutive numerals corresponding to various cycles, a consecutively numbered scale being marked at the edge of the large opening, a rear disc connected with and rotatable relative to the front disc, the inner face of the said rear disc having marked thereon concentrically arranged arcuate spaces consecutively numbered in correspondence with days of the month, the said rear disc being movable to arrange selected numerals thereon in registration with a given aperture in the front disc so as to exhibit through the large opening in the front disc the days constituting the fertile period of the cycle, and an indicator shield pivotally connected with the said discs having a portion disposed to move to obscure portions of the rear disc relative to the large opening in the front disc and adjustable relative to the numbered scale so that tolerance may be made for irregularities in the menstrual cycle.

JOSEPH A. MARQUIS.